United States Patent
Futami et al.

(10) Patent No.: US 7,315,557 B2
(45) Date of Patent: Jan. 1, 2008

(54) MULTI-WAVELENGTH LIGHT SOURCE APPARATUS

(75) Inventors: Fumio Futami, Kawasaki (JP); Shigeki Watanabe, Kawasaki (JP); Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 10/809,841

(22) Filed: Mar. 26, 2004

(65) Prior Publication Data

US 2005/0047453 A1 Mar. 3, 2005

(30) Foreign Application Priority Data

Aug. 27, 2003 (JP) ............... 2003-302727

(51) Int. Cl.
*H01S 3/10* (2006.01)

(52) U.S. Cl. .......................... 372/25; 372/23

(58) Field of Classification Search ........... 372/25, 372/23, 26
See application file for complete search history.

(56) References Cited

U.S. PATENT DOCUMENTS

| | | | |
|---|---|---|---|
| 4,655,547 A | | 4/1987 | Heritage et al. |
| 5,363,221 A | * | 11/1994 | Sutton et al. ............... 359/11 |
| 5,471,490 A | | 11/1995 | Liedenbaum et al. |
| 5,530,544 A | * | 6/1996 | Trebino et al. ............ 356/450 |
| 5,629,802 A | * | 5/1997 | Clark ........................ 359/573 |
| 5,912,911 A | | 6/1999 | Usami et al. |
| 5,923,683 A | * | 7/1999 | Morioka et al. ............... 372/6 |
| 6,081,355 A | | 6/2000 | Sharma et al. |
| 6,195,484 B1 | * | 2/2001 | Brennan et al. ............... 385/37 |
| 6,243,348 B1 | * | 6/2001 | Goodberlet ................ 369/101 |
| 6,341,028 B1 | * | 1/2002 | Bahuguna et al. .......... 359/211 |
| 6,529,463 B1 | * | 3/2003 | Goodberlet ............ 369/109.02 |
| 6,621,878 B2 | * | 9/2003 | Dress et al. ................ 375/316 |
| 6,801,551 B1 | * | 10/2004 | Delfyett et al. ................ 372/23 |
| 2002/0015212 A1 | | 2/2002 | Fujiwara et al. |
| 2002/0041618 A1 | * | 4/2002 | Watanabe et al. ............. 372/76 |
| 2002/0097790 A1 | * | 7/2002 | Dress et al. ................ 375/219 |
| 2002/0150242 A1 | * | 10/2002 | Javidi et al. .................. 380/54 |

(Continued)

FOREIGN PATENT DOCUMENTS

EP  1 241 513  9/2002

(Continued)

OTHER PUBLICATIONS

Hiroyuki Tsuda et al., "Second-and Third-Order Dispersion Compensator Using a High-Resolution Arrayed-Waveguide Grating", IEEE Photonics Technology Letter, vol. 11, No. 5, May 1999, pp. 569-571.

(Continued)

*Primary Examiner*—Phillip Nguyen
(74) *Attorney, Agent, or Firm*—Staas & Halsey LLP

(57) ABSTRACT

A pulse sequence is configured by making a pulse waveform output from a pulse light source into a super Gaussian pulse of the third order or higher, and input to a spectrum expanding device. The spectrum expanding device broadens the spectrum of the pulse sequence with a nonlinear medium. A modulator array extracts longitudinal mode components from the expanded spectrum, and modulates the extracted longitudinal mode components with modulation data. Lastly, the modulated longitudinal mode components are coupled and transmitted to a transmission line.

16 Claims, 5 Drawing Sheets

U.S. PATENT DOCUMENTS

| | | | |
|---|---|---|---|
| 2003/0035187 A1* | 2/2003 | Richardson et al. | 359/189 |
| 2003/0039036 A1* | 2/2003 | Kruschwitz et al. | 359/707 |
| 2004/0109695 A1* | 6/2004 | Watanabe | 398/186 |
| 2004/0179842 A1* | 9/2004 | Futami et al. | 398/75 |
| 2006/0204170 A1* | 9/2006 | Igarashi et al. | 385/24 |
| 2006/0251134 A1* | 11/2006 | Volodin et al. | 372/22 |

FOREIGN PATENT DOCUMENTS

| | | |
|---|---|---|
| JP | 5-257176 | 10/1993 |
| JP | 6-3711 | 1/1994 |
| JP | 6-11750 | 1/1994 |
| JP | 6-43514 | 2/1994 |
| JP | 6-291398 | 10/1994 |
| JP | 8-122833 | 5/1996 |
| JP | 8-234249 | 9/1996 |
| JP | 8-234250 | 9/1996 |
| JP | 9-236834 | 9/1997 |
| JP | 9-244076 | 9/1997 |
| JP | 9-318832 | 12/1997 |
| JP | 9-326528 | 12/1997 |
| JP | 10-223959 | 8/1998 |
| JP | 2003-29645 | 11/2000 |
| JP | 2001-60734 | 3/2001 |
| JP | 2001-249367 | 9/2001 |
| JP | 2002-77052 | 3/2002 |
| JP | 2002-236301 | 8/2002 |
| JP | 2001-264830 | 9/2002 |
| JP | 2002-250946 | 9/2002 |

OTHER PUBLICATIONS

A. M. Weiner et al., "Programmable Femtosecond Pulse Shaping by Use of a Multilement Liquid-Crystal Phase Modulator", Optics Letters, vol. 15, No. 6, Mar. 15, 1990, pp. 326-328.

Hiroaki Sanjoh et al., "Multiwavelength Light Source with Precise Frequency Spacing Using a Mode-Locked Semiconductor Laser and an Arrayed Waveguide Grating Fiber", IEEE Photonics Technology Letters, vol. 9, No. 6, Jun. 1997, pp. 818-820.

* cited by examiner

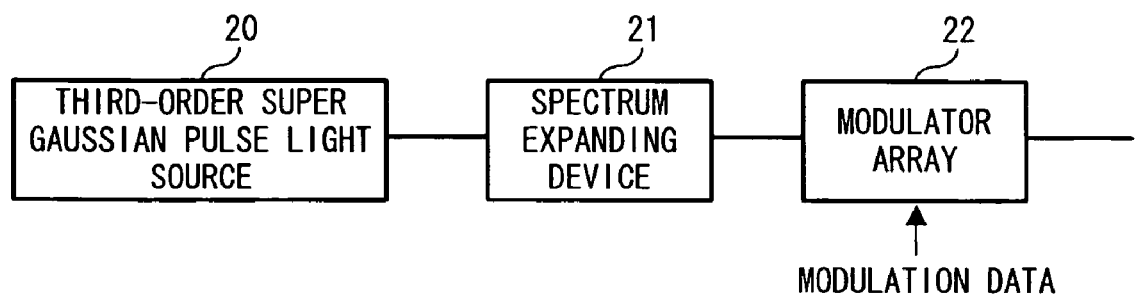
F I G. 3A
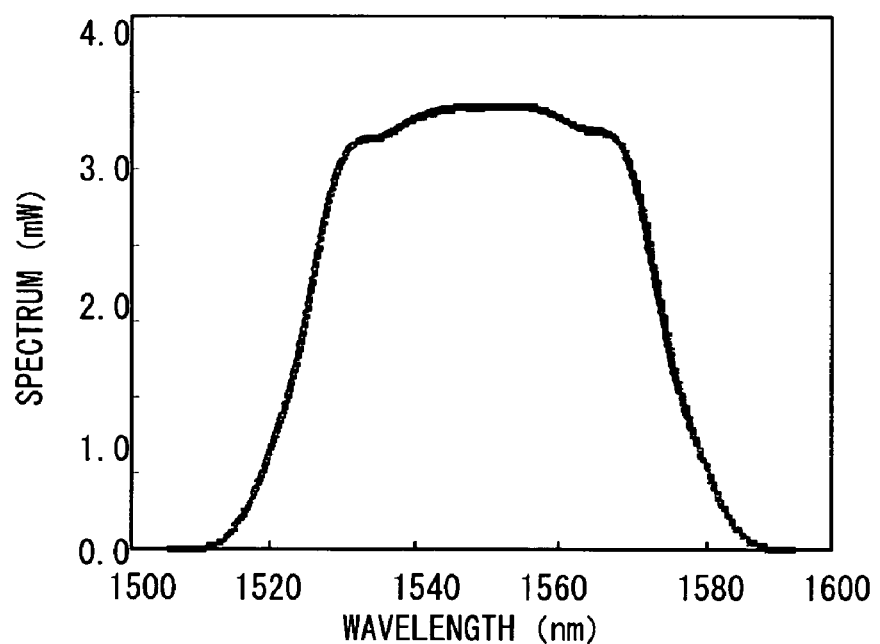
F I G. 3B

MULTI-WAVELENGTH LIGHT SOURCE APPARATUS

BACKGROUND OF THE INVENTION

1. Field of the Invention

The present invention relates to a method and apparatus for easily implementing a multi-wavelength light source the frequency intervals of which are equal.

2. Description of the Related Art

The wavelength of signal light in a WDM (Wavelength Division Multiplexing) optical fiber communications system is stipulated to be arranged on a predetermined frequency grid by the ITU-T recommendations. Therefore, an absolute wavelength must be precisely controlled for an oscillation on this grid.

For a method preparing single wavelength lasers by a required number of channels, firstly, its monitoring/control becomes complicated. Secondly, it is inevitable to increase the size and the power consumption of an apparatus if the number of wavelengths, namely, the number of channels becomes large.

As a method for solving these problems, there is a method for splitting longitudinal mode components caused by modulation, and making the components into a multi-wavelength light source (see Non-Patent Document 1). The longitudinal mode is a spectrum component caused by modulation. If the spectrum of modulated light is viewed with a spectrum analyzer having a low resolution, it is shaped like a moderate mountain. However, if the spectrum is viewed with a spectrum analyzer having a high resolution, it is proved to be actually composed of many spectrum components having a narrow spectrum width. Each spectrum component having a narrow spectrum width, which configures such a spectrum of modulation light, is called a longitudinal mode component.

In FIG. 1, an optical pulse sequence from a pulse light source 10 that outputs an optical pulse sequence of a repetitive frequency $f_0$ Hz is input to a modulator array 11. In a wavelength demutiplexer 11-1, the longitudinal mode components of the optical pulse sequence are split and made into light beams having respective wavelengths. Then, the light beams are modulated by a modulator 11-3, and signals are put on the modulated light beams. Thereafter, these modulated light beams are coupled by a wavelength multiplexer 11-2, and transmitted.

Another characteristic of this method exists in a point that the number of channels can be increased by using spectrum broadening caused by nonlinear effects that occur within a nonlinear medium.

As conventional multi-wavelength light sources, techniques recited in Patent Documents 1 and 2 exist. With the technique recited in Patent Document 1, a longitudinal mode component obtained from modulated light is demultiplexed, and made into a light source of each wavelength. Patent Document 2 discloses the technique with which an optical pulse sequence from a light source that generates an optical pulse sequence is passed through an optical fiber the dispersion of which is flattened to widen the width of a spectrum by nonlinear effects, and a longitudinal component is extracted from the widened spectrum.

[Patent Document 1]

Japanese Patent Application Publication No. 2001-264830

[Patent Document 2]

Japanese Patent Application Publication No. 2002-236301

[Non-Patent Document]

IEEE Photonics Technology Letters, Vol. 9, No. 6, June 1997, pp. 818-820

FIGS. 2A and 2B exemplify the configuration of an optical transmitting apparatus using another conventional multi-wavelength light source, and the shape of a spectrum.

In FIG. 2A, a pulse light source 15 outputs an optical pulse sequence of a repetitive frequency $f_0$ Hz, a spectrum expanding device 16 expands the spectrum of the optical pulse sequence, a modulation array then modulates each longitudinal mode component, and a gain equalizer 18 realizes the same power of each wavelength.

A plurality of single wavelength light sources can be created by extracting the longitudinal mode components of an optical spectrum with a narrow band filter as described above. With the conventional technique shown in FIG. 2A, however, the flatness of the spectrum of light after being broadened is poor, and the powers of respective signal wavelengths significantly vary.

A spectrum broadened by using a Gaussian pulse is exemplified in FIG. 2B. A horizontal axis represents a wavelength, whereas a vertical axis represents power on a linear scale. This spectrum is shaped like an envelope that connects the peaks of longitudinal mode components. Namely, this figure shows the spectrum viewed with a spectrum analyzer having a low resolution. As is known from this spectrum, powers vary by wavelength on the order of several times. Accordingly, it is difficult to create a practical multi-wavelength light source. To actually apply this multi-wavelength light source to a WDM communications system, a gain equalizer that equalizes a power difference among channels must be incorporated. The gain equalizer matches the powers of wavelengths with that of a wavelength having the lowest power. Therefore, light of a wavelength originally having high power is attenuated, so that the loss of optical power increases, and also an optical signal to noise ratio is degraded.

SUMMARY OF THE INVENTION

An object of the present invention is to provide a method and an apparatus, which allow a plurality of single wavelength light sources to be obtained, and implements a multi-wavelength light source with which the output powers of respective wavelengths are made almost equal.

The multi-wavelength light source according to the present invention comprises: an optical pulse light source outputting an optical pulse sequence; an optical pulse shaping unit making the shape of an optical pulse output from the optical pulse light source into a super Gaussian pulse of the third order or higher; a spectrum expanding unit broadening the spectrum of an optical pulse sequence composed of shaped optical pulses; and a light splitting unit splitting the optical pulse sequence the spectrum of which is expanded into light beams of respective frequencies.

According to the present invention, the shape of each pulse of an optical pulse sequence is made into a super Gaussian pulse of the third order or higher, whereby a spectrum obtained after being broadened has a good flatness, and a plurality of light beams having wavelengths the strengths of which are equal can be provided.

The multi-wavelength light source according to the present invention can generate a flat spectrum. As a result, a plurality of single wavelength light sources can be provided without equalizing the optical power of each wavelength.

BRIEF DESCRIPTION OF THE DRAWINGS

FIGS. 3A and 3B show the basic configuration of a preferred embodiment according to the present invention;

DESCRIPTION OF THE PREFERRED EMBODIMENTS

A preferred embodiment according to the present invention overcomes the above described problems with the following means. Namely, the shape of each pulse in a pulse waveform sequence, which is obtained with modulation and whose spectrum is to be broadened, is made into a suitable shape such that the powers of respective wavelengths are made equal after the spectrum is broadened. Specifically, the pulse is made into a super Gaussian waveform of the third order or higher, and its spectrum is then expanded, whereby a multi-wavelength optical source in which the powers of respective wavelengths are almost equal can be implemented.

The following description of the preferred embodiment mainly refers to a multi-wavelength light source using a pulse having a third-order super Gaussian waveform. However, the preferred embodiment is also applicable to a super Gaussian pulse of the third order or higher.

FIGS. 3A and 3B show the basic configuration of a preferred embodiment according to the present invention.

Figure 1:
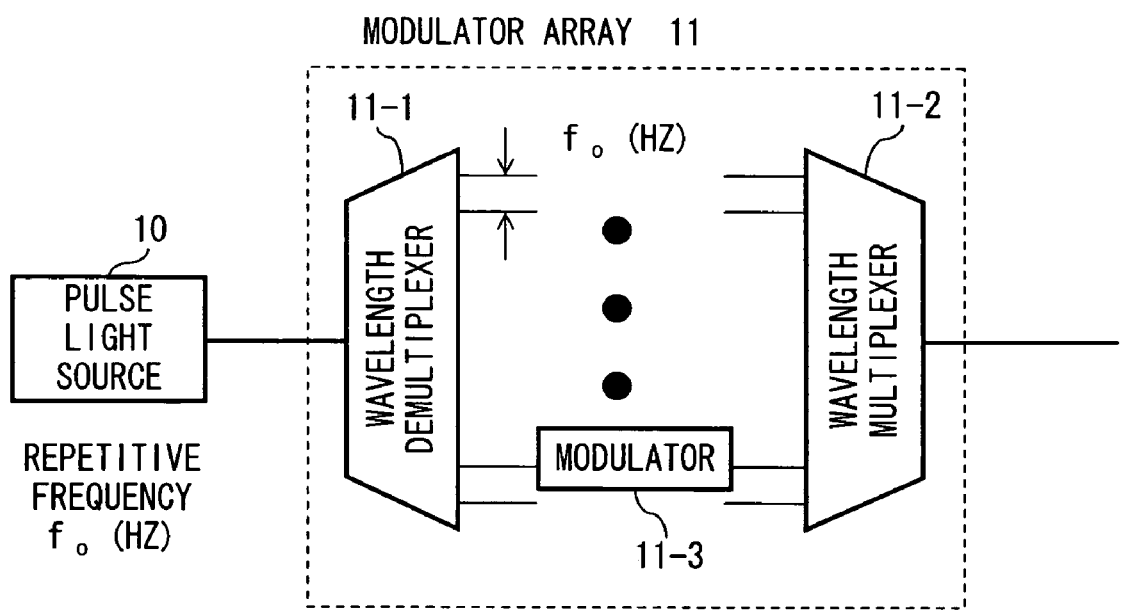
FIG. 1 exemplifies the configuration of a conventional multi-wavelength light source.
Figure 2A:
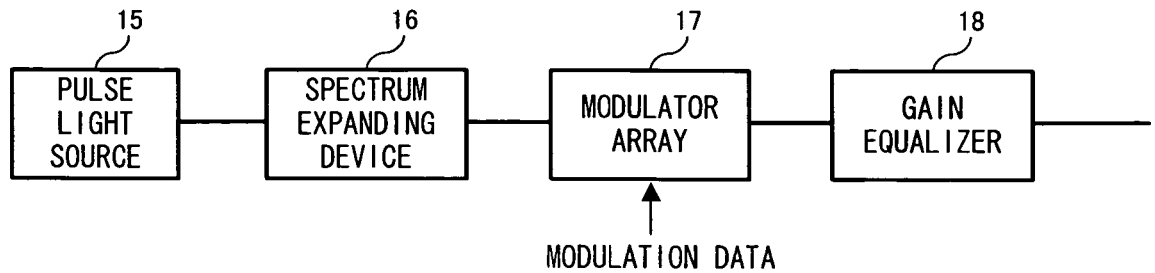
FIGS. 2A and 2B exemplify the configuration of an optical transmitting apparatus using another conventional multi-wavelength light source, and the shape of a spectrum.
Figure 2B:
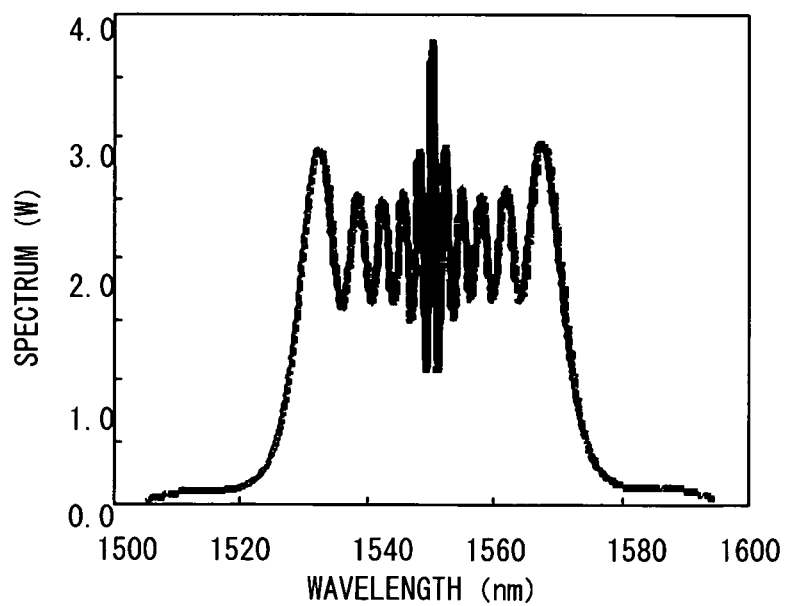

As shown in FIG. 3A, a third-order super Gaussian pulse is generated in a pulse light source 20, its spectrum is expanded to be flat in a nonlinear medium of a spectrum expanding device 21, the light is split into respective wavelengths in a modulation array 22, and all of the wavelengths are again coupled after the data is modulated. FIG. 3B shows a light spectrum obtained by broadening third-order super Gaussian pulses in the nonlinear medium. Also in this figure, the spectrum is shaped like an envelope that connects the peaks of longitudinal mode components, and does not show each longitudinal mode component. Since the spectrum shown in FIG. 3B has a flatness in comparison with FIG. 2B, it is proved that using the third-order super Gaussian pulse (or a super Gaussian pulse of the third order or higher) allows a light source which makes powers almost equal to be obtained if the light is demultiplexed into respective wavelengths.

Examples of a pulse light source include a semiconductor mode synchronous laser, a fiber ring laser, a semiconductor ring laser, a pulse light source using an electro absorption modulator, etc. However, the pulse light source is not limited to these ones. Normally, pulses output from these pulse light sources are pulses of a Gaussian type or a sech type. Accordingly, in a light source, a pulse shaper making these pulses into a third order super Gaussian pulse waveform is required. For this pulse light source for implementing a multi-wavelength light source, a short pulse on the order of several picoseconds is used to effectively cover a broad wavelength band. Since this pulse is faster than the operating speed of an electronic circuit, it cannot be followed with an electric operation method. However, a pulse shaper that shapes a wavelength in a frequency region as an optical signal left unchanged can be used. For example, a pulse shaper using a liquid crystal spatial light modulator (LC-SLM) exists. This shaper can generate a third-order super Gaussian pulse.

Figure 4:
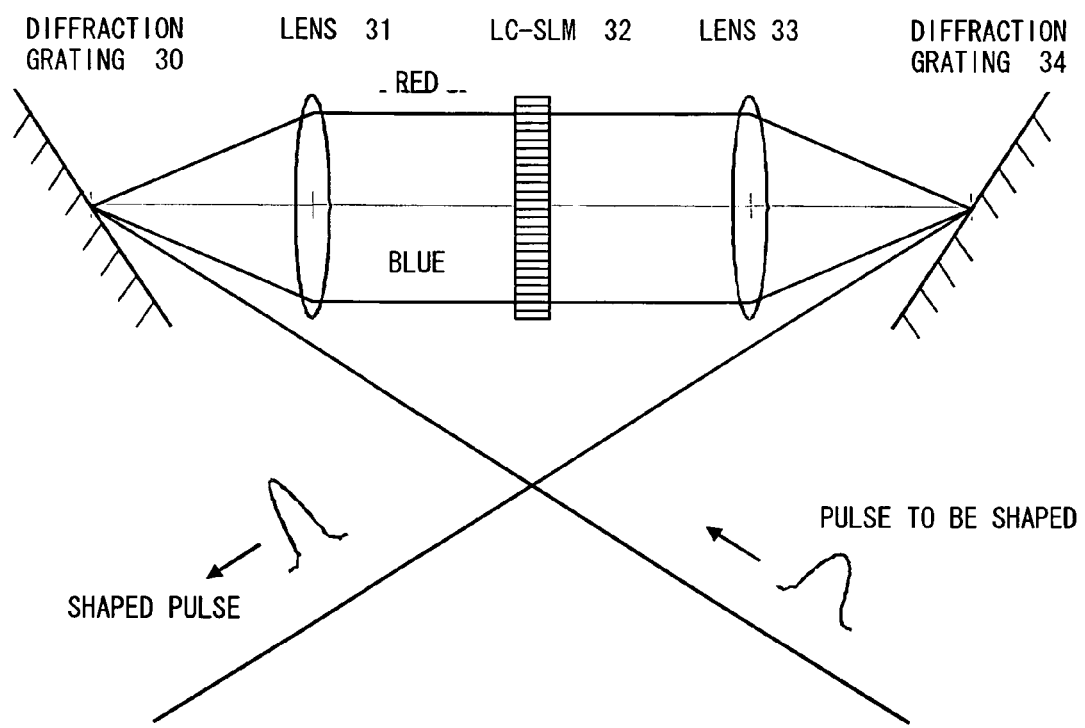
FIG. 4 shows the basic configuration of a liquid crystal spatial light modulator.

FIG. 4 shows the basic configuration of the liquid crystal spatial light modulator.

Initially, pulses to be shaped are split into respective frequencies with a diffraction grating 30, and a focus is achieved on a Fourier plane with a convex lens 31. If a plurality of LC-SLMs 32, which can modulate the intensity and the phase of passing light, are arranged on the Fourier plane, the intensity and the pulse of the entire pulse band can be operated in a frequency region. After being operated, inverse Fourier transform is performed for the pulses with a convex lens 33 and a diffraction grating 34, so that the pulses can be returned to a time domain. For the details of the principle of this waveform shaper, see the document "Opt. Lett. vol. 15, pp. 326-328, 1990". In principle, light beams having respective wavelengths of the light, for which Fourier transforming is performed in the diffraction grating 30, is passed through a liquid crystal spatial light modulator, suitable intensity and phase are given to each wavelength, and the inverse Fourier transform is performed for the light beams in the diffraction grating 34 to return as a waveform on a time axis, so that a desirable waveform can be obtained. Adjustments of the intensity and the phase for each wavelength are made by mathematically representing a preferable waveform, by performing the Fourier transform to calculate the intensity and the phase of each frequency or wavelength component, and by controlling the liquid crystal spatial light modulator based on the calculation.

On the Fourier plane, a light resolution is determined by the characteristic of a diffraction grating, the beam diameter of light, and an incident angle to the diffraction grating. A larger value of the light resolution and a resolution determined by the width of crystal liquid spatial modulation becomes the resolution of the Fourier transform. In the meantime, a bandwidth is determined uniquely by the focal distance and the diffraction angle of the convex lens.

Figure 5:
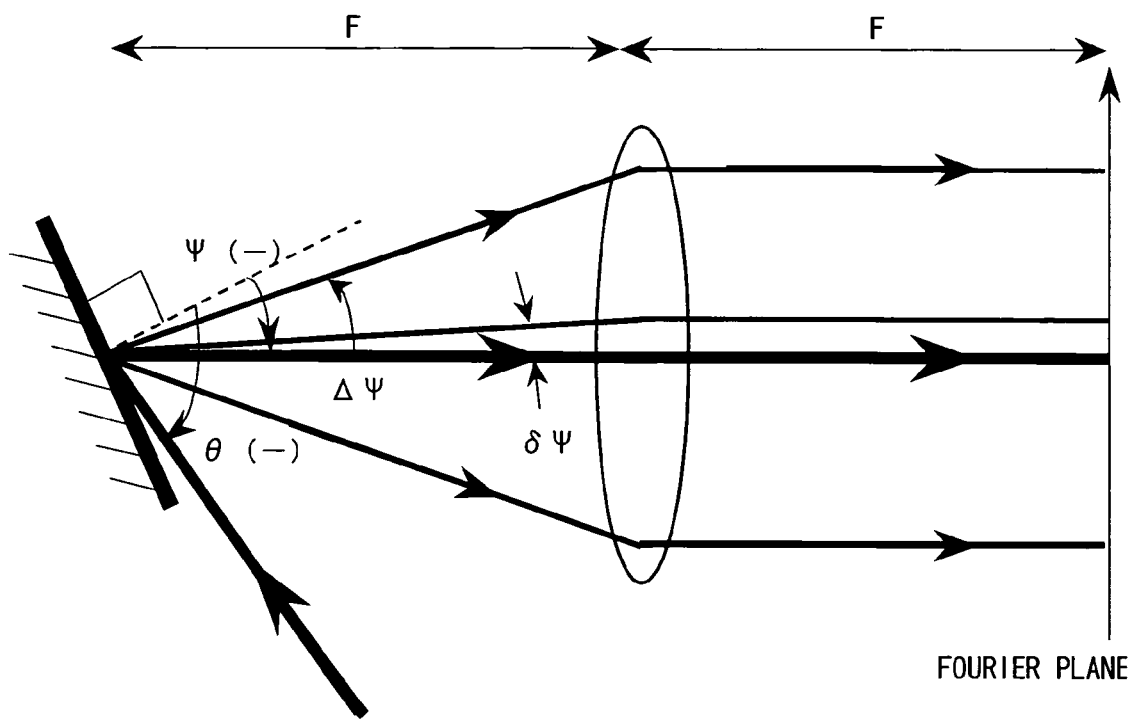
FIG. 5 explains the definitions of symbols used in equations.

FIG. 5 explains the definitions of symbols used in equations.

Specifically, a resolution ($\delta\lambda$), and a bandwidth ($\Delta\lambda$), which are determined by the diffraction grating, etc., are represented by the following equations.

$$\frac{\lambda}{\delta\lambda} = mN\frac{R}{\cos\theta}$$

$$\Delta\lambda = 2F\Delta\psi$$

where $\lambda$ indicates the wavelength of light, R indicates the beam diameter of the light, $\theta$ indicates the incident angle to the diffraction grating, N indicates the number of grooves (per unit length) of the diffraction grating, m indicates the order of the diffraction grating, which normally takes $\pm 1$, and F indicates the focal distance of the convex lens. As is known from FIG. 5, $\Psi(-)$ is an angle obtained by measuring the angle at the center of light reflected by the diffraction grating from a normal of the diffraction grating. The angle is orientated in a negative direction. $\delta\Psi$ indicates a deviation from the center of the reflected light as an angle. $\theta(-)$ indicates the incident angle of incident light, which is measured from the normal of the diffraction grating, and the angle is orientated in the negative direction. $\Delta\Psi$ indicates a spreading angle of the light that is spectrum-decomposed and reflected by the diffraction grating.

If a diffraction grating having a large number of grooves is used, and if the incident angle is controlled to set cosθ to a small value, a resolution of sub-nm can be achieved. In the meantime, if 128 liquid crystal modulators the width of which is 0.1 mm are arranged, the photofield of a bandwidth on the order of picoseconds can be operated.

Assuming that the electric field of a desired third-order super Gaussian pulse is $E_{m=3}(t)$, a transfer function $T(\omega)$ given by an LC-SLM is defined as follows.

$$T(\omega) = \frac{\tilde{E}_{m=3}(\omega)}{\tilde{E}_0(\omega)}$$

where ~indicates Fourier transform, and $E_0(t)$ indicates an incident pulse waveform.

As another method, there is a method performing Fourier transform with a planner lightwave circuit (PLC). In this case, diffraction the order of which is high can be implemented, so that Fourier transform can be made with a compact configuration. For the details, see the reference "Y. Inoue, et al., IEEE Photonics Technology Letters, pp. 569-571, v. 11, no. 5, 1999". This document discloses an array waveguide grating having a capability similar to a diffraction grating.

In this preferred embodiment, the diffraction grating 30 may be a component that splits light. Similarly, the diffraction grating 34 may be a component-that couples split light beams. Accordingly, these components are not limited to the diffraction gratings.

For example, a virtually imaged phased array (VIPA) element, which is disclosed by Japanese Patent Publication No. HEI09-043057, or the like, may be available as an alternative to a diffraction grating.

A spectrum spreading device is configured by a nonlinear medium having the third-order nonlinear effects. A spectrum is spread by the nonlinear effects within the medium. As the nonlinear medium, a highly nonlinear fiber whose nonlinear refractive index is improved by doping Ge, a holey fiber the nonlinearity of which is enhanced by reducing an effective core cross-sectional area with a plurality of holes made on the cross section of the fiber, or the like is effective. A spectrum spreading method is disclosed by Japanese Patent Publication No. 2002-77052.

What is claimed is:

1. A multi-wavelength light source, comprising:
    an optical pulse light source outputting an optical pulse sequence;
    an optical pulse shaping unit making a shape of an optical pulse output from said optical pulse light source into a super Gaussian pulse of a third order or higher;
    a spectrum expanding unit expanding a spectrum of an optical pulse sequence composed of shaped optical pulses; and
    an optical splitting unit splitting the optical pulse sequence, the spectrum of which is expanded into light beams of respective frequencies by extracting longitudinal mode components of the optical sequence whose spectrum is expanded.

2. The multi-wavelength light source according to claim 1, wherein
    said spectrum expanding unit expands the spectrum by using an optical fiber as a nonlinear medium.

3. The multi-wavelength light source according to claim 1, wherein
    said spectrum expanding unit expands the spectrum by using a highly nonlinear fiber or a holey fiber as a nonlinear medium.

4. A multi-wavelength light source, comprising:
    an optical pulse light source outputting an optical pulse sequence;
    an optical pulse shaping unit making a shape of an optical pulse output from said optical pulse light source into a super Gaussian pulse of a third order or higher;
    a spectrum expanding unit expanding a spectrum of an optical pulse sequence composed of shaped optical pulses; and
    an optical splitting unit splitting the optical pulse sequenced the spectrum of which is expanded into light beams of respective frequencies,
    wherein said optical pulse shaping unit comprises
        a wavelength splitter performing Fourier transform for the optical pulse sequence,
        a spatial modulator controlling an intensity, or an intensity and a phase of a Fourier component, and
        a wavelength coupler coupling light beams for which spatial modulation is performed.

5. The multi-wavelength light source according to claim 4, wherein
    said wavelength splitter and said wavelength coupler are a diffraction grating or an array waveguide grating filter.

6. A multi-wavelength light generating method, comprising:
    outputting an optical pulse sequence;
    shaping an optical pulse output from an optical pulse light source into a super Gaussian pulse of a third order or higher;
    expanding a spectrum of an optical pulse sequence composed of shaped optical pulses; and
    splitting the optical pulse sequence, the spectrum of which is expanded into light beams of respective frequencies, by extracting longitudinal mode components of the optical sequence whose spectrum is expanded.

7. The multi-wavelength light generating method according to claim 6, wherein the spectrum expanding comprises using an optical fiber as a nonlinear medium to expand the spectrum.

8. The multi-wavelength light generating method according to claim 6, wherein the spectrum expanding comprises using a highly nonlinear fiber or a holey fiber as a nonlinear medium.

9. A multi-wavelength light generating method, comprising:
    outputting an optical pulse sequence;
    shaping an optical pulse output from an optical pulse light source into a super Gaussian pulse of a third order or higher;
    expanding a spectrum of an optical pulse sequence composed of shaped optical pulses; and
    splitting the optical pulse sequence, the spectrum of which is expanded into light beams of respective frequencies,
    wherein said light pulse shaping comprises
        performing Fourier transform for the optical pulse sequence,
        controlling an intensity, or an intensity and a phase of a Fourier component, and
        coupling light beams for which spatial modulation is performed.

10. The multi-wavelength light generating method according to claim 9, wherein
a diffraction grating or an array waveguide grating filter is used in said Fourier transform performing and said coupling.

11. An apparatus, comprising:
an optical pulse light source to output an optical pulse sequence;
an optical pulse shaper to shape an optical pulse output from said optical pulse light source into a super Gaussian pulse of a third order or higher;
a spectrum expander to expand a spectrum of the optical pulse sequence composed of shaped optical pulses from the optical pulse shaper; and
an optical splitter to split the expanded spectrum of shaped optical pulses into light beams of respective frequencies, by extracting longitudinal mode components of the optical sequence whose spectrum is expanded.

12. A method of making multi-wavelength light with almost equal powers for respective frequencies from optical pulse light, comprising:
shaping the optical pulse into a super Gaussian of a third order or higher;
expanding the spectrum of an optical pulse sequence composed of the shaped optical pulses; and
splitting the optical pulse sequence into respective frequencies by extracting longitudinal mode components of the optical sequence whose spectrum is expanded.

13. The method of making multi-wavelength light with almost equal powers for respective frequencies from optical pulse light according to claim 12, wherein the spectrum expanding comprises using an optical fiber as a nonlinear medium to expand the spectrum.

14. The method of making multi-wavelength light with almost equal powers for respective frequencies from optical pulse light according to claim 12, wherein the spectrum expanding comprises using a highly nonlinear fiber or a holey fiber as a nonlinear medium.

15. A method of making multi-wavelength light with almost equal powers for respective frequencies from optical pulse light, comprising:
shaping the optical pulse into a super Gaussian of a third order or higher;
expanding the spectrum of an optical pulse sequence composed of the shaped optical pulses; and
splitting the optical pulse sequence into respective frequencies,
wherein said light pulse shaping comprises
performing Fourier transform for the optical pulse sequence,
controlling an intensity, or an intensity and a phase of a Fourier component, and
coupling light beams for which spatial modulation is performed.

16. The method of making multi-wavelength light with almost equal powers for respective frequencies from optical pulse light according to claim 15, wherein
a diffraction grating or an array waveguide grating filter is used in said Fourier transform performing and said coupling.

* * * * *

UNITED STATES PATENT AND TRADEMARK OFFICE
CERTIFICATE OF CORRECTION

PATENT NO. : 7,315,557 B2 Page 1 of 1
APPLICATION NO. : 10/809841
DATED : January 1, 2008
INVENTOR(S) : Fumio Futami et al.

It is certified that error appears in the above-identified patent and that said Letters Patent is hereby corrected as shown below:

On the title page item (56), Column 2 (Other Publications), Line 1, "Second-and" to --Second- and--.

Column 6, Line 16, change "sequenced" to --sequence,--.

Signed and Sealed this

First Day of July, 2008

JON W. DUDAS
*Director of the United States Patent and Trademark Office*